United States Patent [19]

Fujioka

[11] Patent Number: 4,692,917
[45] Date of Patent: Sep. 8, 1987

[54] PACKET SWITCHING SYSTEM
[75] Inventor: Masanobu Fujioka, Tokyo, Japan
[73] Assignee: Kokusai Denshin Denwa Co., Ltd., Tokyo, Japan
[21] Appl. No.: 802,116
[22] Filed: Nov. 25, 1985
[30] Foreign Application Priority Data Nov. 27, 1984 [JP] Japan .............................. 59-248781

[51] Int. Cl.$^4$ ............................................ H04Q 11/04
[52] U.S. Cl. ................................................... 370/60
[58] Field of Search ........................ 370/58, 60, 94, 53

[56] References Cited
U.S. PATENT DOCUMENTS

4,486,878 12/1984 Havermans ........................... 370/60
4,566,095 1/1986 DeVault et al. ...................... 370/60

Primary Examiner—Douglas W. Olms
Assistant Examiner—Wellington Chin
Attorney, Agent, or Firm—Armstrong, Nikaido, Marmelstein & Kubovcik

[57] ABSTRACT

In a packet switching system of the present invention, a packet handler is facilitated for each incoming circuit to the switching system. The packet handler analyzes the header of each incoming packet from the correspondent circuit and decides the outgoing route of the packet. The packet is then sent out to an outgoing circuit of the decided route, the rest of it including the data field not being stored in the switching system, through a conventional cross-point switch for circuit-switching. Thus, elimination of storing the whole packet raises the efficiency of packet processing and shortens the processing delay. The use of a cross-point switch enables the functional sharing of the system by circuit-switched calls and packet-switched calls.

6 Claims, 9 Drawing Figures (a) FUNDAMENTAL STRUCTURE OF SWITCHING SYSTEM

Fig. 3a (a) FUNDAMENTAL STRUCTURE OF SWITCHING SYSTEM (b) FUNDAMENTAL FORMAT OF PACKET

PACKET SWITCHING SYSTEM

BACKGROUND OF THE INVENTION

The present invention relates to a packet switching system and more precisely to the type of packet switching system which is provided with a packet handler, corresponding to each incoming circuit of the system, which is capable of processing the header of a packet and deciding its outgoing route of the packet and in which the switching of packets to their outgoing circuits is realized through a cross-point switch for circuit switching which makes connections between the packet handlers and outgoing circuits of the packet switching system. Thus, the necessity of storing all the bits of individual packets in the switching system is eliminated to improve the efficiency of packet processing. The present packet switching system can also deal with circuit-switched calls sharing a cross-point switch with packet-switched calls.

Figure 1:
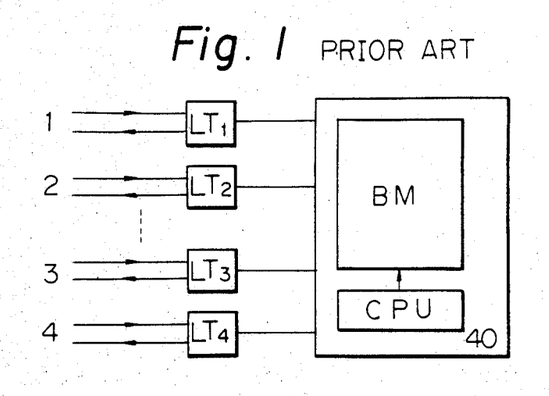
FIGS. 1 and 2 are diagrammatical illustrations, respectively, of two examples of the structure of the conventional packet switching systems.

One example of the structure of the conventional packet switching system is shown in FIG. 1 wherein numerals 1, 2, 3 and 4 designate packet communication circuits, $LT_1$ through $LT_4$ designate circuit terminating units, and numeral 40 designates a packet processing unit. Further, BM in the packet processing unit designates a buffer memory which is commonly used for packets to all the outgoing routes and CPU designates a central processing unit. In this structure, the circuit terminating units $LT_1$ through $LT_4$ control signal transmission/reception and error correction (e.g., by HDLC procedures) and all received packets are once stored in the common buffer memory BM. The stored packets are then analyzed to determine their outgoing routes under the control of the central processing unit CPU and are transmitted over the circuits of the outgoing routes via the circuit terminating units $LT_1$ through $LT_4$.

Figure 2:
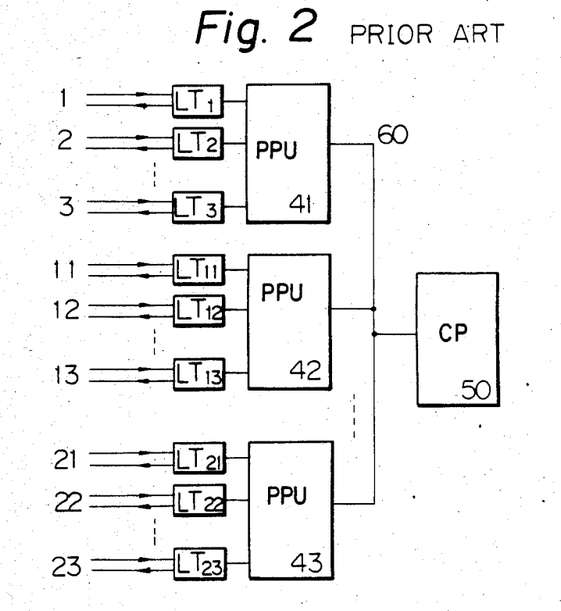

Another example of the conventional packet switching system is shown in FIG. 2. In FIG. 2, numerals 1 through 3, 11 through 13 and 21 through 23 designate packet communication circuits, respectively, $LT_1$ through $LT_3$ designate circuit terminating units. Numeral 50 designates a control processor and numeral 60 designates an internal communication bus. In the shown structure, the packet processing units 41 through 43 control the buffer memory and process packet headers. The control processor 50 controls the entire system and performs processings which are common throughout the system such as packet call routing control.

However, the conventional packet switching systems shown in FIGS. 1 and 2 have had such disadvantages that the control of the centralized buffer memory for storage of all the packets therein and the link-by-link sequence and flow controls of the packets have been complicated; it has been difficult to process a large number of packets efficiently because the amount of packet processing load has been large; and as the whole packets must have been once stored in the memory, the delay of packet transfer time has been accelerated.

SUMMARY OF THE INVENTION

It is an objective, therefore, of the present invention to overcome the disadvantages and limitations of prior packet switching systems by providing a new packet switching architecture.

It is also an objective of the present invention to provide a packet switching system which is simple in structure, and provides the shorter processing delay.

The features of the present invention reside in the system structure that a plurality of packet handlers each capable of analyzing the header of each incoming packet and determining its outgoing route are provided one per each incoming circuit and the transmission of the packet to the outgoing circuit is performed through a cross-point switch which has been used for conventional circuit switching so that the amount of storage of packets in the packet switching system and the time delay for packet processing are minimized, thereby simplifying the entire processing in the system and the system can be shared by circuit-switched and packet-switched calls.

BRIEF DESCRIPTION OF THE DRAWINGS

The foregoing and other objective, features, and attendant advantages of the present invention will be appreciated as it becomes better understood by means of the following description and accompanying drawings wherein.

DESCRIPTION OF THE PREFERRED EMBODIMENTS

Figure 3A:
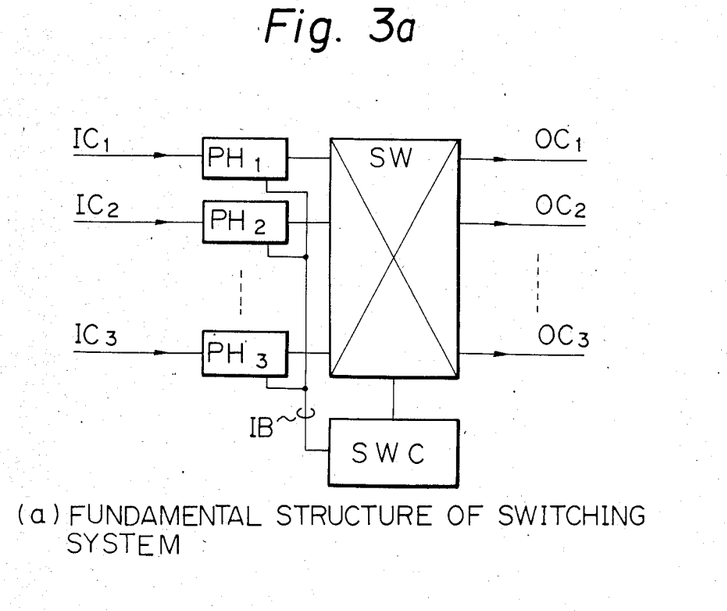
FIGS. 3a and b are diagrammatical illustrations of the principle of the present invention wherein 3(a) is a diagram showing the basic structure of a packet switching system and 3(b) is a diagram showing the basic structure of a packet.
Figure 3B:
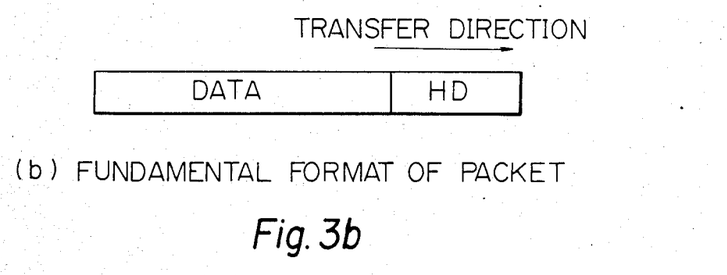

FIG. 3 is a diagrammatical illustration of the principle of the present invention wherein FIG. 3(a) illustrates the basic structure of a switching system of the present invention and FIG. 3(b) illustrates the basic structure of a packet used with the present invention. In FIG. 3(a), $IC_1$, $IC_2$, and $IC_3$ designate incoming circuits to the packet switching system, $OC_1$, $OC_2$, and $OC_3$ designate outgoing circuits, SW designates a cross-point switch for circuit switching, SWC designates a switch controller, $PH_1$, $PH_2$, and $PH_3$ designate packet handlers and IB designates a bus for the transfer of control information signals between each of the PHs and the SWC. Further, in FIG. 3(b), HD designates the header of a packet and DATA designates the user data field of a packet.

Upon receipt of the header HD of a packet transmitted through the incoming circuit $IC_1$, $IC_2$ or $IC_3$ the packet handler $PH_1$, $PH_2$ or $PH_3$ analyzes the routing information within the header of the packet received by it and determines the outgoing route for the packet. When the outgoing route has been determined, each of the packet handlers $PH_1$, $PH_2$ and $PH_3$ transmits to the switch controller SWC through the bus IB an information signal including the determined outgoing route and the request to make the connection between one of the outgoing circuits in the outgoing route and the packet handler. Further, each of the packet handlers PHs renews the header HD of the incoming packet for its transfer to the next following switching system.

Upon receipt of the abovementioned control information signal, the switch controller SWC connects one of a plurality of idle circuits in the requested outgoing route to the packet handler PH from which the signal has been transmitted. Thus, when the connection is complete, a connection completion signal is transmitted from the switch controller SWC back to the packet handler PH through the bus IB and upon receipt of the connection completion signal, the packet handler PH initiates the transmission of the renewed header HD followed by the user data field DATA. It is not necessary for the packet handler PH to have received the whole packet to initiate the transmission of the packet header HD.

Upon completion of the transmission of the whole packet, the packet handler PH transmits a connection release request signal to the switch controller SWC, and upon receipt of this signal the switch controller SWC releases its connection to the outgoing circuit OC which has been connected to the abovementioned packet handler PH to thereby free the outgoing circuit OC.

In the embodiments of the present invention, the cross-point switch SW may be a cross-bar switch or a time-division switch. Further, the bus IB may be an electrical bus such as coaxial cable, a paired cable or an optical-fiber loop cable.

In the case of the present invention in which only a part of the packet is stored in the switching system according to the abovementioned principle, the amount of storage of packets in the system and the time delay of packet transmission are minimized as compared with the conventional packet switching system so that the packet processing is simplified resulting in higher performance being obtained, and provided with the cross-point switch the system can be used for not only the packet-switched calls but also circuit switched calls in the form of function sharing.

One embodiment of the present invention will now be described with reference to the accompanying drawings.

Figure 4:
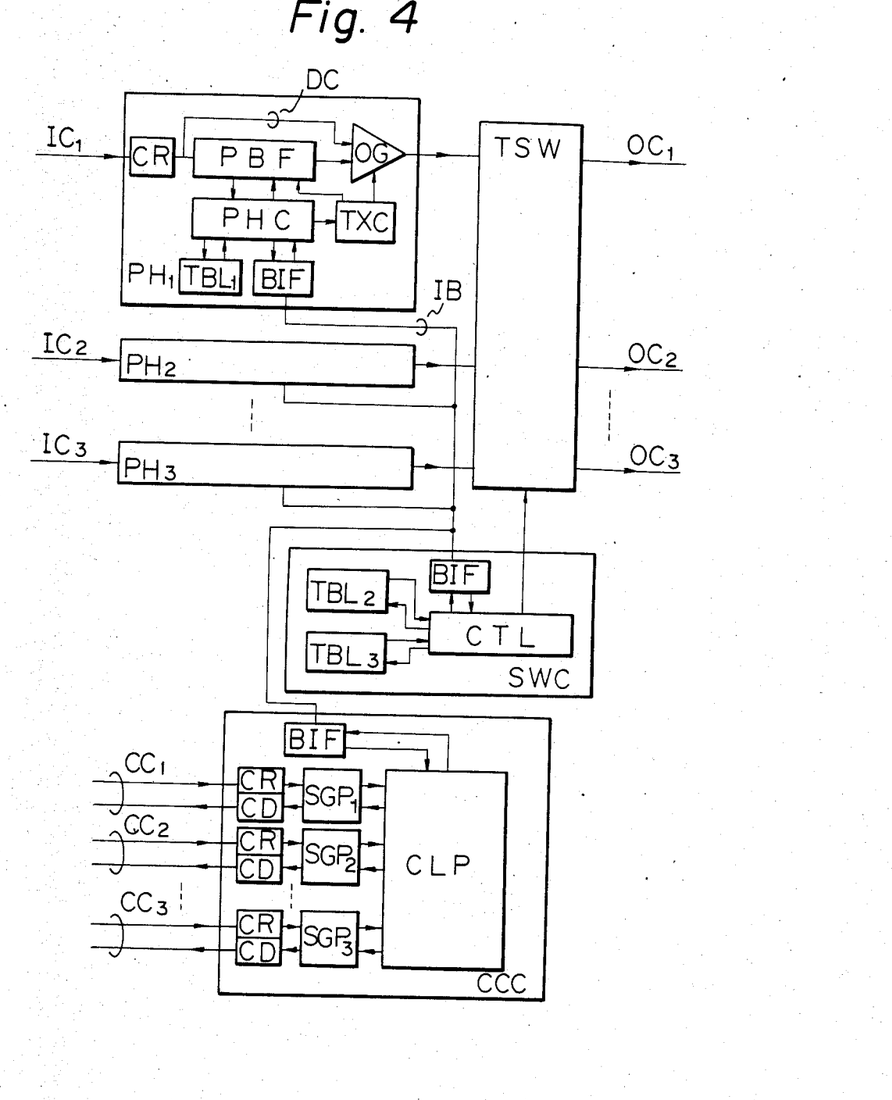
FIG. 4 is a diagrammatical illustration of one embodiment of the present invention.

FIG. 4 shows one embodiment of packet switching system according to the present invention. In FIG. 4, $IC_1$, $IC_2$ and $IC_3$ designate incoming circuits to the packet switching system; $PH_1$, $PH_2$ and $PH_3$ designate packet handlers corresponding to the incoming circuits $IC_1$, $IC_2$ and $IC_3$ respectively; SWC designates a switch controller; CCC designates a common channel signaling control section; IB designates a bus for the transfer of control signals among the packet handlers PHs, the switch controller SWC and the common channel signaling control section CCC; $OC_1$, $OC_2$ and $OC_3$ designate outgoing circuits, from the packet switching system; $CC_1$, $CC_2$ and $CC_3$ designate common signaling channels, provided between the packet switching system and other packet switching systems; and TSW designates a time-division switch.

In the instant embodiment, all the control signals for setting up and releasing a virtual call (VC) in the packet communication system are transferred through the common signaling channels CCs and are processed by the common channel signaling control section CCC. Only data packets including user communication data are transferred through the incoming circuits $IC_1$, $IC_2$ and $IC_3$ or the outgoing circuits $OC_1$, $OC_2$ and $OC_3$. Each data packet includes a logical channel number. In the case of a temporary VC, this logical channel number is determined when the VC is set up. Further, in the case of a permanent virtual circuit (PVC) for which a VC is being set up permanently, a logic channel number is assigned permanently. Similarly, regarding the datagram type packets which are transferred independently of one another without setting up any VC, a permanently assigned logical channel number is also used.

In the present embodiment, each of the packet handlers PHs has a $TBL_1$ which indicates associations among logical channels used on the incoming circuit IC side, logical channels used on the outgoing circuit OC side and outgoing routes. When a VC is set up by transmitting and receiving through common signaling circuits $CC_1$, $CC_2$ and $CC_3$ call control signals based on the procedures of a common channel signaling system (for example, the CCITT No. 7 signaling system provided with a VC setting-up and releasing functions), the common channel signaling control section CCC notifies through the bus IB the logical channel numbers on the incoming and the outgoing sides of the VC and its outgoing route to all the packet handlers PHs connected to all the incoming circuits ICs which have the possibility of receiving the packets of the VC. When each of the packet handlers PHs receives the abovementioned logical channel numbers and the outgoing route, it registers them in the $TBL_1$. In FIG. 4, CR designates a cable receiver for terminating each of the incoming circuits CCs and electrically converting the external signal on the CCs into internal signal within the control section CCC; CD designates a cable driver for electrically converting the internal signal within the control section CCC into the external signal on each of the outgoing circuits CCs; SGP designates a signal transfer processing unit for controlling the transfer of the control signals onto the signaling channel CC or correcting transfer errors on the CC; CLP designates a call processing unit performing the setting up and releasing of a VC by transmitting and receiving the control signals to or from other switching systems on the basis of the common channel signaling procedures. Further, BIF designates a bus interface for controlling the transmission and reception of various kinds of signals with respect to other modules within the switching system.

The $TBL_1$ within the packet handler PH retains, in addition to the associations among the VC input side logical channel numbers, the VC output side logical channel numbers and the VC outgoing route numbers as already mentioned, the associations among the PVC input side logical channel numbers, the PVC output side logical channel numbers and the PVC outgoing routes and the associations among the input and output side logic channel numbers and the outgoing route regarding the datagram type packets.

Figure 5:
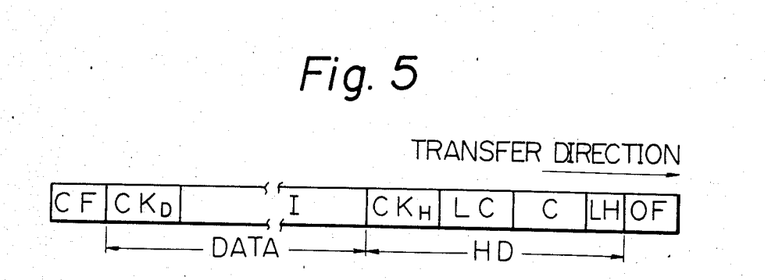
FIG. 5 shows a packet format used in the embodiment shown in FIG. 4.

A packet format used in the instant embodiment is shown in FIG. 5 wherein OF designates a packet opening flag, CF designates a packet closing flag, HD designates a packet header and DATA designates a data field of the packet. Within the header HD, LH designates the length of the header, C designates the sequence number of each packet and control information such as a more-data indication in case one data block is transferred by segmenting it into a plurality of packets, LC designates a logical channel number and CHK designates a error check code for detecting errors in the transfer of the packet header.

When the packet handler PH begins to receive a packet of the format shown in FIG. 5 from the incoming circuit IC through the cable receiver CR, it stores the header in the packet buffer PBF in sequence per each receiving bit. The packet header control unit PHC monitors the packet buffer PBF constantly and when the entire header HD of the packet has been received, begins to analyze it. Thus, when it is confirmed as a result of analysis of the check code CKH that there is no error in the transfer of the header, the PHC obtains an outgoing route number and a logical channel number of each packet on the outgoing circuit side, according to the logical channel number included in the header HD of the packet and with reference to the $TBL_1$.

Next, when the outgoing route number of the packet is obtained, the packet header control unit PHC requests the switch controller SWC, through the bus IB, to connect one of idle circuits in the above-mentioned outgoing route to its own packet handler PH. Upon receipt of this request, the switch controller SWC inspects the presence or absence of such idle circuits in the route with reference to $TBL_2$. $TBL_2$ in the switch controller SWC designates a table showing the association between the outgoing route number and the outgoing circuits and from this table, it is possible to retrieve the outgoing circuit numbers for each outgoing route. Further, $TBL_3$ designates a table showing whether or not there is idle outgoing circuits and for individual routes from this table it is possible to retreive whether or not each outgoing circuit is in use. Therefore, when any idle circuit in the desired outgoing route is found with reference to the $TBL_2$ and $TBL_3$, the $TBL_3$ is so renewed that the packet handle PH (which has requested the above-mentioned connection) and the retrieved outgoing circuit be connected to each other through the time-division switch TSW while the outgoing circuit is held busy. On the other hand, in the absence of an idle circuit, the request from the packet handler PH is held reserved until any idle circuit is present in the desired outgoing route and thereafter the packet handler PH and the idle circuit are connected to each other. In any of the above cases, when the connection between the packet handler PH and the outgoing circuit is completed, the switch controller SWC informs the packet handler PH of that matter through the bus IB.

Upon receipt of the connection completion information, the packet handler PH which has requested the connection begins to transmit the packet to the outgoing circuit. In this case, the logical channel number LC of the header HD of the packet is changed to the logical channel number LC on the outgoing circuit side and at the same time, the check code CHK is also changed accordingly and is then transmitted. The transmission of the packet is performed in such a manner that the transfer control unit TXC opens an output gate OG for the packet from the buffer PBF through a command from the packet header control unit PHC.

Thus, upon completion of transmission of the packet closing flag CF, the packet handler PH informs the switch controller SWC to that effect through the bus IB and the switch controller SWC releases the connection between the packet handler PH and the outgoing circuit through the time-division switch TSW and renews the $TBL_3$ to make the circuit state to be idle.

In case the check code CHK of the header HD of the packet received by the packet handler PH fails to take an expected value due to transmission error, the packet is discarded. Further, in case packet transmission is delayed due to all the outgoing circuits being busy over a prolonged period of time so that the amount of stored packets exceeds the limited length of the packet buffer PBF within the packet handler PH, the last received packet is discarded. When, however, the re-transmission of the discarded packet is required, it can be realized by the sequence control procedures between the two users or the two local switching systems end-to-end.

The foregoing is the packet switching system according to the instant embodiment.

Next, the scheme for realizing the circuit switched connection according to the instant embodiment will be described. Control of the circuit switching connection according to the instant embodiment is performed by exchanging, between switching systems, signal messages based on the circuit switched call control procedures of a common channel signaling system (e.g., the circuit switched call control procedures of the No. 7 signaling system), which is implemented in the common circuit signaling control section CCC.

Upon receipt of a circuit switched connection request from another switching system through a common signaling channel CC, the common signaling control section CCC determines an outgoing route and then notifies, through the bus IB, the outgoing route number to the packet handler PH which is connected to the incoming circuit for the requested circuit switched connection, together with a circuit switched connection command. Then, upon receipt of the information and the command, the packet handler PH requests the switch controller SWC to connect the handler PH itself to one of the idle circuits in the desired outgoing route in the same manner as in the case of the above-mentioned packet communication. Upon receipt of the notice of connection completion from the switching controller SWC, the packet header controller PHC of the packet handler PH gives the transfer control unit TXC a command to establish direct connection between the incoming circuit IC and the time-division switch TSW. The transfer control unit TXC controls the output gate OG and establishers the connection between a direct circuit DC and the time-division switch TSW. When this connection is completed, the packet handler PH notifies the common channel signaling control section CCC of the completion of connection and the common channel signaling control section CCC receiving the notification sends a circuit connection request to the subsequent switching system.

Thus, the circuit switched connection in one direction is complete with the above-mentioned procedures but in case circuits are required to be set up in the opposite direction at the same time, it is possible to do so by following the above-mentioned procedures after the common channel signaling control section CCC has received a connection request from the opposite direction.

The releasing of the circuit switched connection is performed in such a manner that when the common channel signaling control section CCC receives a release request through the common signaling channel CC, it gives a release command to the packet handler PH whereupon the packet handler PH releases the connection between the direct circuit DC and the time-division switch TSW. After that, the packet handler PH requests the switch controller SWC to release the connection of the switch TSW and at the same time, notifies the common channel signaling control section CCC that the connection has been released. The control section CCC in turn notifies the switching system (which has made the release request) of the completion of the release and at the same time, transmits to the subsequent switching node a request for releasing the connection of the subsequent circuit.

As described above, in the case of the embodiment shown in FIG. 4, the packet handlers PHs are provided in correspondence to the incoming circuits and each of the handlers PHs has an independent packet buffer and therefore, the complicated buffer control as has been experienced in the concentrated buffer scheme can be avoided. Further, as it is not necessary to store the whole packets in the switching system and the transmission of the packet is started as soon as an idle circuit is provided, the amount of storage of packets in the switching system can be reduced and the time delay in packet transfer can be minimized. Further, by transmitting the packets through the cross-point switch, it is possible to use the system also for circuit switched calls thereby easily enabling the realization of an integrated communication switching network for circuit switching and packet switching. In addition, since the functions of each packet handler PH corresponding to each incoming circuit are unified, it is easy to realize it by a large scale integrated circuit (LSI) thereby contributing to the miniaturization of the packet switching system and the promotion of the reliability of the system.

Next, another embodiment according to the present invention in which each packet handler PH in FIG. 4 is replaced with a packet handler PH shown in FIG. 6 will be described.

Figure 6:
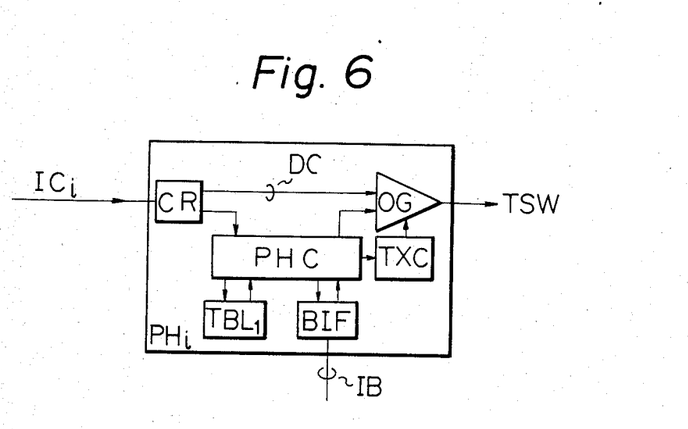
FIG. 6 is a diagrammatical illustration of another embodiment of a packet handler used in the embodiment in FIG. 4.

The difference between the packet handler PH in FIG. 6 and that shown in FIG. 4 is that in the case of the former, no packet buffer PBF is present in the packet handler PH but regarding the basic structure of the section PH, no difference exists between them.

Figure 7:
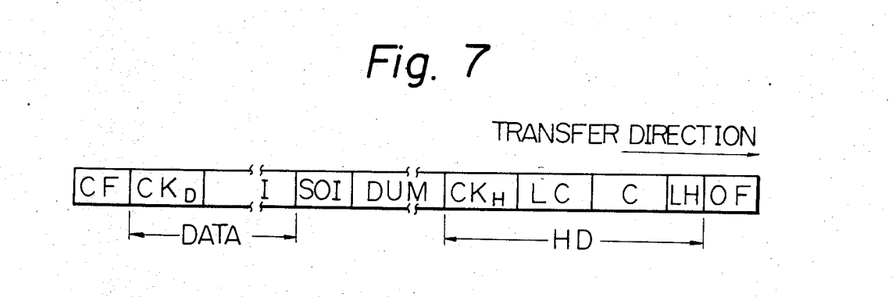
FIG. 7 shows a packet format used in an embodiment employing the packet handler shown in FIG. 6.

Next, the operation of an embodiment using the packet handler PH shown in FIG. 6 will be described. To begin with, a packet format for this embodiment is shown in FIG. 7. The difference between the format in FIG. 7 and that in FIG. 5 is that in the case of the former, the dummy field DUM is transmitted after the header HD. When the packet handler PH in FIG. 6 receives the header HD of a packet having the format shown in FIG. 7, it requests the switch controller SWC to connect the time-division switch TSW as in the case of the embodiment in FIG. 4. Then, upon receipt of a notice of completion of the connection from the switch controller SWC, the packet header control unit PHC transmits to an outgoing circuit the header HD which has been renewed for the outgoing circuit through the output gate OG under the control of the transfer control unit TXC. After that, the unit PHC gives an instruction to the transfer control unit TXC to connect the direct circuit DC directly to the outgoing circuit to thereby transmit the data field DATA of the packet. The packet header control unit PHC constantly monitors the flow of the packet to be received and when the packet closing flag CF has been received and transmitted, it gives an instruction to release the connection of the time-division switch TSW. In this embodiment, the dummy field DUM in FIG. 7 is made to have a length sufficiently larger than the time required for the closing of the switch TSW so that the data field DATA is transmitted completely. Further, in case the time required for closing the switch is long and the packet header control unit PHC has received the indicator SOI indicating the beginning of the data field DATA of the packet, prior to the reception of the connection completion information from the switch control section SWC, the transmission of the packet is either suspended according to the packet classification shown in a control field C of the header HD (for example, in the case of a data packet between a computer and a terminal unit), or the remaining data section DATA is transmitted after the SOI is transmitted from the packet header control unit PHC to the outgoing circuit (as in the case of a voice packet, for example).

As described above, the instant embodiment has, in addition to the effects of the embodiment shown in FIG. 4, has advantages that it is possible to completely eliminate the storage of packets in the packet handler PH and to simplify the structure of the packet handler PH and the processing performed thereby.

Next, still another embodiment of the present invention will be described.

Figure 8:
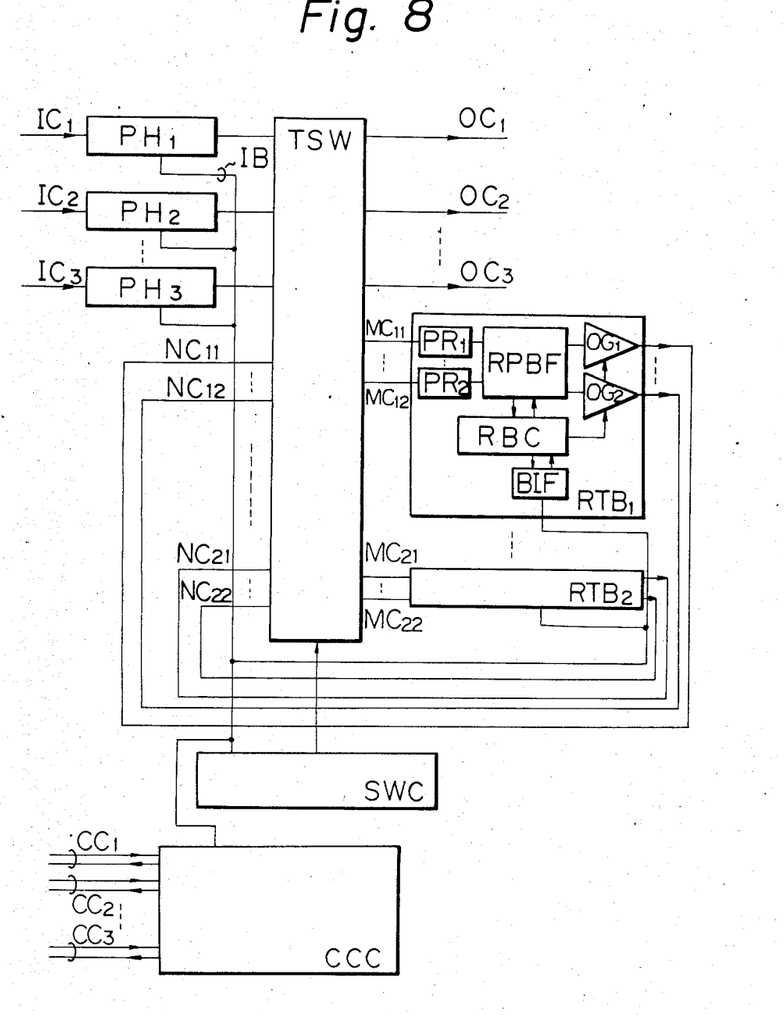
FIG. 8 is a diagrammatical illustration of still another embodiment of the present invention.

FIG. 8 shows an embodiment of a packet switching system according to the present invention. In FIG. 8, PH, TSW, SWC, CCC, IC, OC, CC and IB are the same as those shown in FIG. 4. RTB designates a route packet transfer unit, PR in RTB designates a packet receiver, RPBF designates a route packet buffer, RBC designates a route buffer controller, OG designates an output gate and BIF designates an interface with respect to the internal bus IB. Further $MC_{11}$ through $MC_{22}$ designate connecting circuits from the time-division switch to the packet transfer unit RTB and $NC_{11}$ through $NC_{22}$ designate connecting circuits from the packet transfer unit RTB to the time-division switch TSW.

The operation of the instant embodiment is basically the same as that of the embodiment shown in FIG. 4 but it differs from the latter when the amount of packets stored in the packet buffer PBF within the packet handler PH becomes large. That is, when, after a switch connection request is made to the switch controller SWC by a certain packet handler PH, the number of packets (for example, the number of bits) stored in the packet buffer PBF exceeds a predetermined limit before a switch connection completion notification is received, the packet handler PH requests the switch controller SWC to transmit to the packet transfer unit RTB the non-transmitted packets waiting for the switch connection completion notification. Then, upon receipt of such a request, the switch controller SWC reserves one of the packet transfer units RTBs for outgoing route of these packets, connects the packet handler PH (which have requested the connection) and one of the incoming circuits MCs of the packet transfer unit RTB through the time-division switch TSW and sends a connection complete notification to the packet handler PH. The packet handler PH receiving such a notification transmits the standby packets and from thence assumes the ordinary operation mode as already explained with reference to the embodiment shown in FIG. 4. Further, when the switch controller SWC reserves any packet transfer unit RTB for a certain outgoing route, it notifies the RTB that it has been reserved and the outgoing route number through the bus IB.

During the time in which any packet transfer unit RTB is reserved for a certain outgoing route, the switching controller SWC, upon receipt of a request for connection to the outgoing route from the packet handler PH, connects the packet handler PH and the packet transfer unit RTB reserved for that outgoing route so that the packet designated for the outgoing route is transmitted to the transfer unit RTB.

When a packet is received by the packet receiver PR in the packet transfer unit RTB, it is stored in the route packet buffer RPBF in sequence. Thus, when the packet is stored in the packet buffer RPBF, the route packet buffer controller RBC requests the switch controller SWC through the bus IB to connect itself to the circuit in the desired outgoing route as in the case of the packet handler PH. However, since there are a plurality of outgoing circuits (NC) in the packet transfer unit RTB, a plurality of connection requests may, if necessary, be made depending on the number of packets stored in the packet buffer RPBF. Upon receipt of a connection completion notification from the switch controller SWC, the packet transfer unit RTB opens the output gate OG to transmit the stored packets to the outgoing circuits in sequence.

When all the packets stored in the packet buffer RPBF have been transmitted and if no new packet is being received, the packet transfer unit RTB gives the switch controller SWC a packet transmission completion notification. The switch controller SWC receiving the notification processes any connection request it may receive thereafter from the packet handler PH with respect to the corresponding outgoing route so as not connect the packet handler PH to the packet transfer unit RTB but to the outgoing circuit OC directly as in the case of the embodiment in FIG. 4.

In the instant embodiment, when the outgoing circuits in a plurality of outgoing routes are congested simultaneously, each packet transfer unit RTB is reserved for each route. Further, when the outgoing circuits in some outgoing route are congested while all the packet transfer units RTBs are reserved the packet transfer unit RTB can not longer be reserved so that the packet buffer PBF within the packet handler PH is filled with packets as in the case of the embodiment in FIG. 4 and newly received packets are discarded.

In order to transmit the received packets to the outgoing circuits in sequence, if there are further packets to be transmitted following the transmission of one packet, the packet transfer unit RTB transmits the above-mentioned further packets in seccession without giving the switch controller SWC any transmission completion notification after the transmission of the closing flag CF of the first packet but instead giving the notification after completion of transmission of all the outstanding packets for that route.

As described above, the present embodiment has, besides the effect derived from the embodiment in FIG. 4, such an advantage that by providing the common buffer for congested outgoing routes, it is possible to minimize the probability of descarding receiving packets and to realize a packet communication system of high serviceability.

As described in detail in the foregoing sections, it is possible with the present invention to simplify the processing of packets at each packet switching system in a packet communication system and to manufacture with ease a switching system of comparatively high processing capacity. Further, since the switching system of the present invention can be used for circuit switched calls in a single implementation, it is possible to construct an integrated packet and circuit switched communication network easily. Further, since the time duration for storing packets in the switching system can be minimized, it is possible to minimize the packet transfer time. In addition, it is possible to miniaturize the packet switching system and to make it reliable by implementing packet handlers PHs with LSIs.

From the foregoing it is now be apparent that a new and improved packet switching system can be realized according to the present invention. It should be understood of course that the embodiments disclosed are merely illustrative and are not intended to limit the scope of the invention. Reference should be made to the appended claims, therefore, rather than the specification as indicating the scope of the invention.

What is claimed is:

1. A packet switching system comprising:
    a plurality of incoming circuits;
    a plurality of outgoing circuits;
    a plurality of packet handlers, one for each incoming circuit;
    a cross-point switch of circuit switching capability to connect and switch the incoming circuits and the outgoing circuits through the packet handlers;
    a switch controller to select idle circuits in the desired outgoing routes and to control the establishment, and release of the connections of the cross-point switch; and
    an internal bus to transfer control information signals between each of the packet handlers and the switch controller;
    wherein each of the packet handlers processes the header of each incoming packet from the corresponding incoming circuit, analyzes the routing information included in the header so as to determine an outgoing route for the packet and transfers to the switch controller through the internal bus a request for the connection of the packet handler and one of the outgoing circuits in the outgoing route;
    the switch controller, upon receipt of the connection request from the packet handler, connects one of the outgoing circuits in the outgoing route and the packet handler through the cross-point switch and transfers a connection completion signal to the packet handler through the internal bus;
    the packet handler, upon receipt of the connection completion signal, transmits the data field following the header of the packet to the above-mentioned outgoing circuit and after the completion of transmission of the entire packet, transfers a transmission completion signal to the switch controller through the internal bus; and
    the switch controller repeats the establishment and the release of the connection, between each of the packet handlers and one of the outgoing circuits by opening and closing the cross-point switch for each packet,
    wherein only a part of the packet is stored in the switching system and the switching of the packet is performed by a circuit switching operation.

2. The packet switching system as described in claim 1 in which the packet handler provided for each of the incoming circuits includes a packet buffer for storing a part of or the entire packet temporarily so that the packet handler is connected to the cross-point switch through the packet buffer.

3. The packet switching system as described in claim 1 in which the packet handler provided for each of the incoming circuits has the function of directly connecting the incoming circuit and the circuit which connects the packet handler and the cross-point switch.

4. The packet switching system as described in any one of claims 1, 2 or 3 in which dummy bits of a time width larger than that of the time required for the connection establishment of the cross-point switch is inserted between the header and the data field of each packet.

5. The packet switching system as described in any one of claims 1, 2 or 3 in which packets in a desired outgoing route are once stored in a memory common to all the incoming circuits when all the outgoing circuits in the desired outgoing route are in use and then the packets are transmitted to those of the outgoing circuits of the route that has become idle.

6. The packet switching system as described in claim 5 in which control signals for setting up, and releasing virtual calls, for flow control and for sequence control are transmitted through common signaling channels different from packet transfer circuits.

* * * * *